United States Patent [19]
Wang

[11] Patent Number: 5,465,936
[45] Date of Patent: Nov. 14, 1995

[54] ROTATABLE BRACKET OF A MONITOR

[76] Inventor: Tsong L. Wang, No. 3, Hsing Yeh St., Kuei Shan Hsiang, Tao Yuan, Taiwan

[21] Appl. No.: 291,162

[22] Filed: Aug. 16, 1994

[51] Int. Cl.⁶ ................................................. F16M 11/00
[52] U.S. Cl. .................. 248/371; 248/349.1; 248/921
[58] Field of Search .................................. 248/349, 371, 248/397, 919, 920, 921, 922, 923, 286

[56] References Cited

U.S. PATENT DOCUMENTS

| | | | |
|---|---|---|---|
| 4,068,961 | 1/1978 | Ebner et al. | 248/921 X |
| 4,365,779 | 12/1982 | Bates et al. | 248/921 X |
| 4,483,503 | 11/1984 | Gahan | 248/349 |
| 4,554,590 | 11/1985 | Chelin et al. | 248/921 X |
| 4,562,988 | 1/1986 | Bumgardner | 248/349 |
| 4,589,713 | 5/1986 | Pfuhl et al. | 248/349 X |
| 4,880,191 | 11/1989 | Lake, Jr. | 248/371 |
| 5,024,415 | 6/1991 | Purens | 248/371 X |
| 5,102,082 | 4/1992 | Bang | 248/921 X |
| 5,145,134 | 9/1992 | Hashimoto et al. | 248/371 X |
| 5,398,903 | 3/1995 | Cho | 248/349 |

*Primary Examiner*—Karen J. Chotkowski
*Attorney, Agent, or Firm*—Kirkpatrick & Lockhart

[57] ABSTRACT

A rotatable bracket includes a base plate and an upper plate rotatably engaged on the base plate. The base plate defines a hemispherical recess at substantially a central portion thereof. A boss is projected upward from substantially a center of the hemispherical recess. A post is extended upward from a center of the boss. A plurality of wings are radially extended from substantially a periphery of the boss thus defining a space between the wings and a surface of the hemispherical recess. The upper plate includes a hemispherical protrusion extended downward from a bottom side thereof thus simultaneously defining a convex surface and a concave surface at two opposite faces of the hemispherical protrusion. An elongated hole and a substantially square hole are defined in the upper plate and in communication with each other. The wings of the base plate are manually passed through the substantially square hole of the upper plate and are allowed to slide along two elongated plate portions defining the elongated hole, meanwhile the upper plate is permitted to be rotated with respect to the boss of the base plate.

3 Claims, 5 Drawing Sheets

5,465,936

ROTATABLE BRACKET OF A MONITOR

BACKGROUND OF THE INVENTION

1. Field of the Invention

The present invention relates to a rotatable bracket of a monitor, and more particularly to one which is manually rotatable to turn a screen of the monitor to a preferred angle as required by a user.

2. Description of the Prior Art

A rotatable bracket for a monitor or the like is used commonly in a personal computer. FIG. 4 illustrates a conventional rotatable bracket including a base plate 30, a rotatable receptacle 40 rotatably connected to the base plate 30 by means of a linking plate 50. FIG. 5 illustrates an exploded view of the bracket of FIG. 4. The base plate 30 comprises an annular protrusion 31 projected from an upper surface therefrom, a circular protrusion 32 projected from the upper surface substantially at the center of the annular protrusion 31, and a bar 33 projecting from an upper surface of the circular protrusion 32. A space is defined between the annular protrusion 31 and the circular protrusion 32. The rotatable receptacle 40 has a lower shell bottom 42 shaped to be rotatably received in the space defined between the annular protrusion 31 and the circular protrusion 32. An elongated hole 41 is defined in substantially a central portion of the rotatable receptacle 40 and rotatably engaged with the circular protrusion 32 of the base plate 30, with an upper portion including the bar 33 of the circular protrusion 32 passing upward through the elongated hole 41. A slot 51 defined in the linking plate 50 is engaged with the bar 33 of the circular protrusion 32 of the base plate 30 thus limiting the rotatable receptacle 40 between the linking plate 50 and the base plate 30. Two holes in the linking plate 50 and two holes in the circular protrusion 32 are mated with each other and are connected by two screws 55, thus further increasing the connection between the linking plate 50 and the base plate 30. The rotatable receptacle 40 has two walls 43 formed beside the elongated hole 41. The linking plate 50 has two wings 52 extending from the periphery thereof. The wings 52 of the linking plate 50 and the two walls 43 of the rotatable receptacle 40 cooperate to limit the rotatable receptacle 40 to rotate in an angular range with respect to the base plate 30.

However, the conventional rotatable bracket has some drawbacks to be overcome. Firstly, the base plate 30, the rotatable receptacle 40, and the linking plate 50 each require a corresponding mold for fabrication, thus the total tooling cost is relatively expensive. Secondly, the assembly work of the conventional rotatable bracket is troublesome and takes time. For example, to thread the screws into the corresponding holes takes time. It is requisite to provide a new rotatable bracket which includes fewer parts thus requiring fewer molds for fabrication of the parts and less time to assemble the parts into the rotatable bracket.

The present invention has arisen to mitigate and/or obviate the afore-described disadvantages of the conventional rotatable bracket.

SUMMARY OF THE INVENTION

The primary objective of the present invention is to provide a rotatable bracket which comprises a minimum number of parts thus requiring relatively fewer molds and less time in assembling the parts into the rotatable bracket.

In accordance with one aspect of the invention, there is provided a rotatable bracket which includes a base plate and an upper plate rotatably engaged on the base plate. The base plate defines a hemispherical recess at substantially a central portion thereof. An annular protrusion projecting from an upper surface of the base plate substantially encloses the hemispherical recess. A boss is projected upward from substantially a center of the hemispherical recess. A post is extended upward from a center of the boss. A plurality of wings are radially extended from substantially a periphery of the boss thus defining a space between the wings and a surface of the hemispherical recess. The upper plate includes a hemispherical protrusion extending downward from a bottom side thereof thus simultaneously defining a concave hemispherical surface at an opposite side of the hemispherical protrusion. An elongated hole and a substantially square hole are defined in the upper plate and are in communication with each other. A hook is extended upward from the hemispherical surface of the upper plate which is substantially extended upward from a wall of the square hole. The hook includes a flat head which defines a semicircular cutout at one end thereof. The wings of the base plate are forcibly passed through the square hole of the upper plate and two elongated plate portions along the elongated hole are allowed to be manually slid with respect to the wings of the base plate, meanwhile the upper plate is permitted to be rotated with respect to the boss of the base plate.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
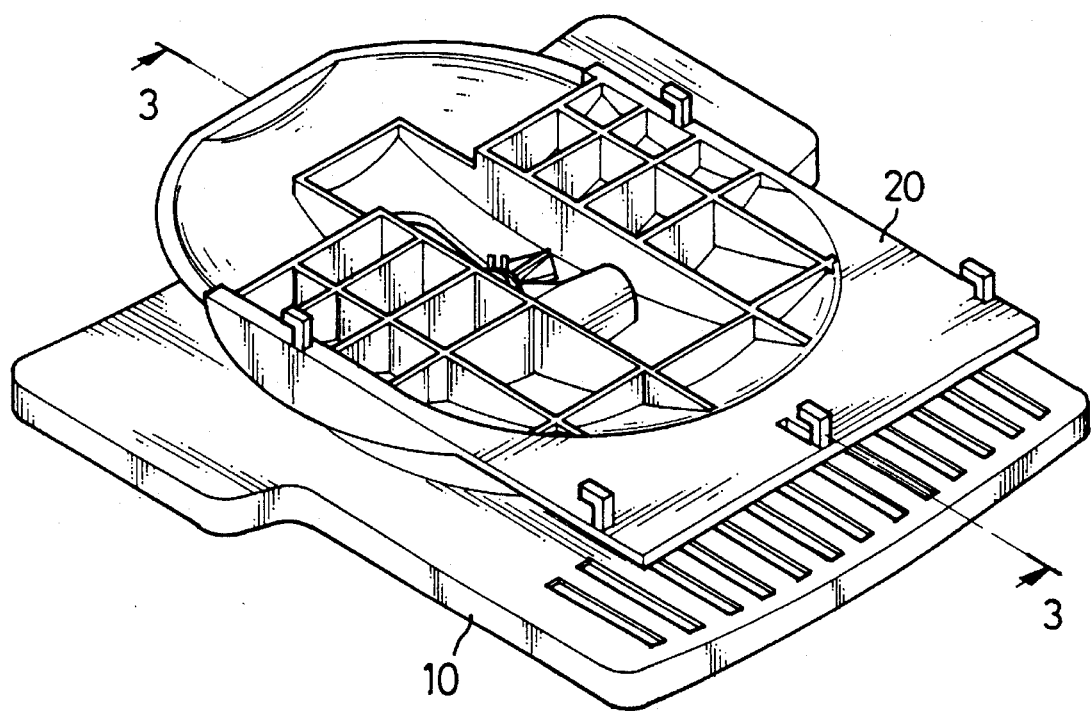
FIG. 1 is a perspective view of a rotatable bracket in accordance with the present invention.
Figure 2:
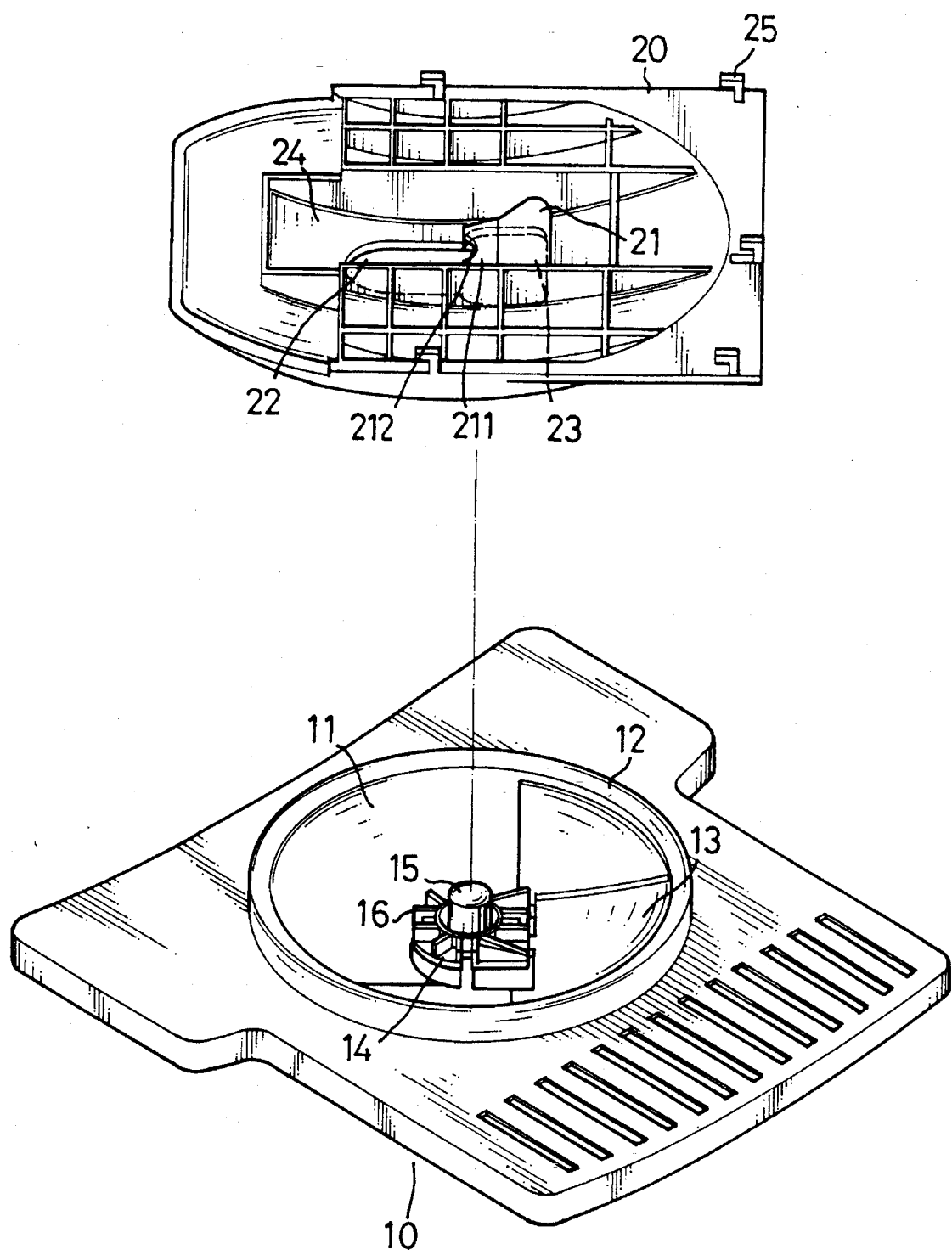
FIG. 2 is an exploded view of a rotatable bracket of FIG. 1.

Referring to FIG. 1, a rotatable bracket in accordance with the present invention comprises a base plate 10 and an upper plate 20 slidably and rotatably engaged on the base plate 10. Additionally referring to FIG. 2, the base plate 10 defines a hemispherical recess 11 at substantially a central portion thereof. An annular protrusion 12 projected from an upper surface of the base plate 10 substantially encloses the hemispherical recess 11. Two relative grooves 13 are defined in a surface of the hemispherical recess 11 and in communication with each other. Two relative protrusions 13' are formed on the surface of the hemispherical recess 11 and are separated by the two communicated grooves 13. A boss 14 is extended upward from substantially a central point of the hemispherical recess 11. A post 15 is extended upward from the boss 14. A plurality of wings 16 are radially extended from substantially an upper periphery of the boss 14 thus defining a space between the wings 16 and a surface of the spherical recess 11.

The upper plate 20 has a hemispherical protrusion 24 extended downward from a bottom side thereof thus simultaneously defining a convex hemispherical surface and a concave hemispherical surface at two opposite sides of the hemispherical protrusion 24. An elongated hole 22 and a substantially square hole 23 are defined in the upper plate 20 and are in communication with each other. A bar 26 (see FIG. 3) is projected from the bottom side of the upper plate 20 substantially along a wall of the elongated hole 22. Also referring to FIG. 3, a hook 21 extended upward from the hemispherical surface of the upper plate 20 substantially extended upward from a wall defining the square hole 23 includes a flat head 211 which defines a semi-circular cutout 212 at one end thereof.

Figure 3:
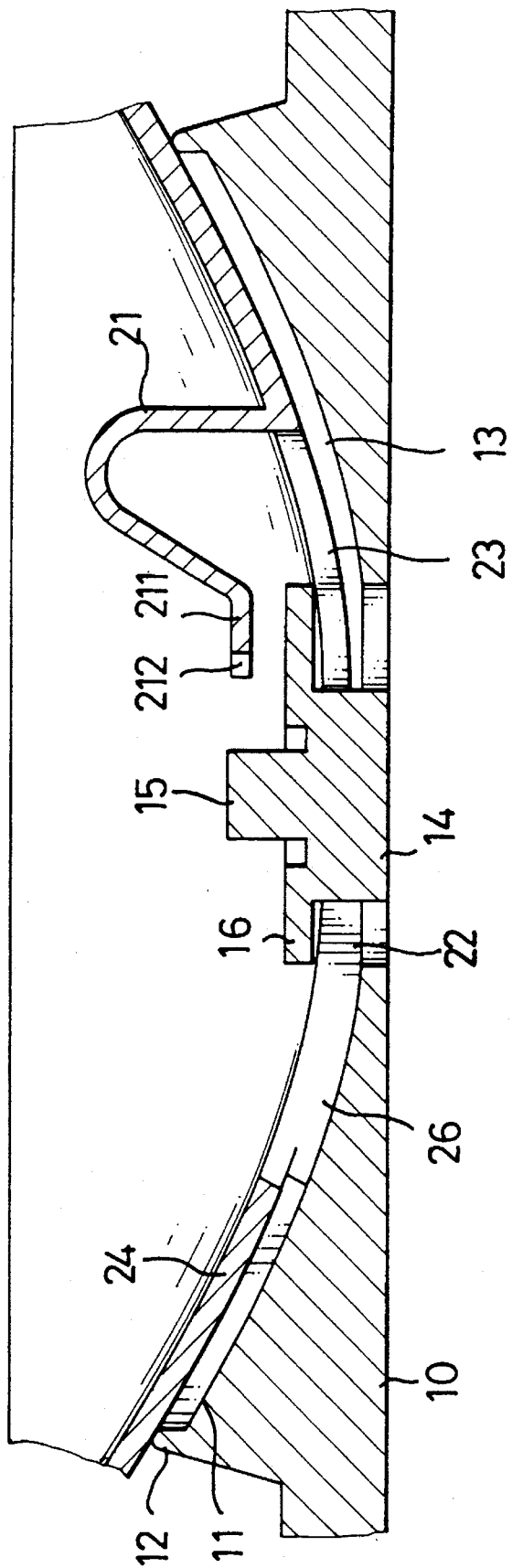
FIG. 3 is a cross-sectional view taken from lines 3—3 of FIG. 1.
Figure 4:
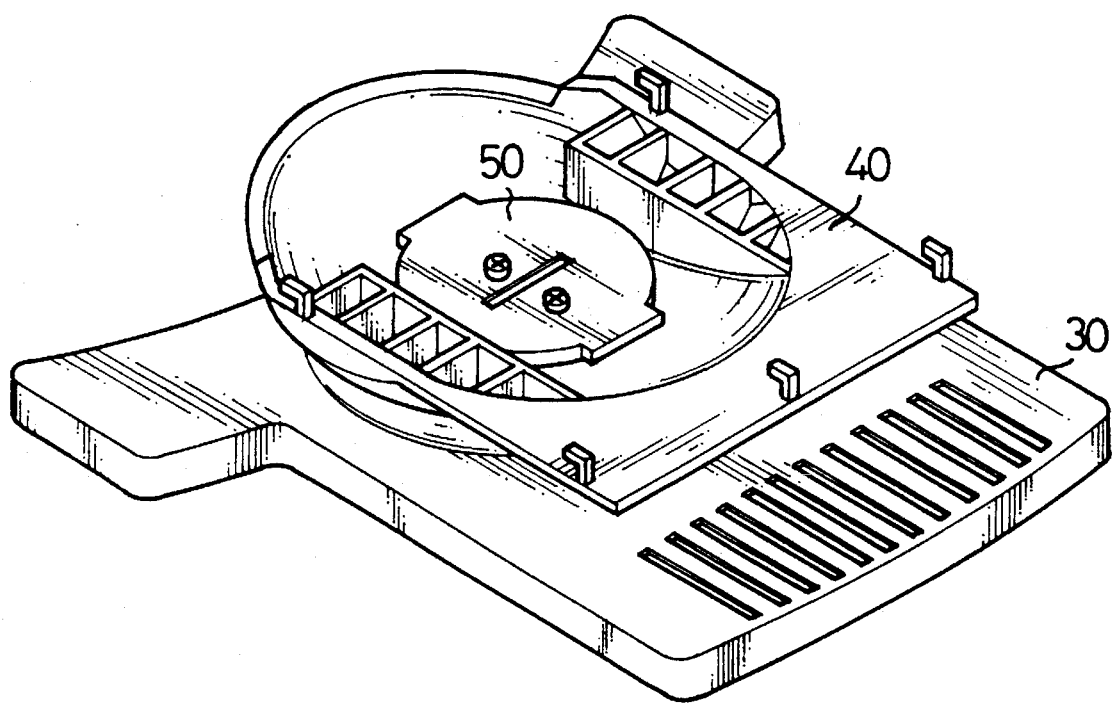
FIG. 4 a conventional rotatable bracket.
Figure 5:
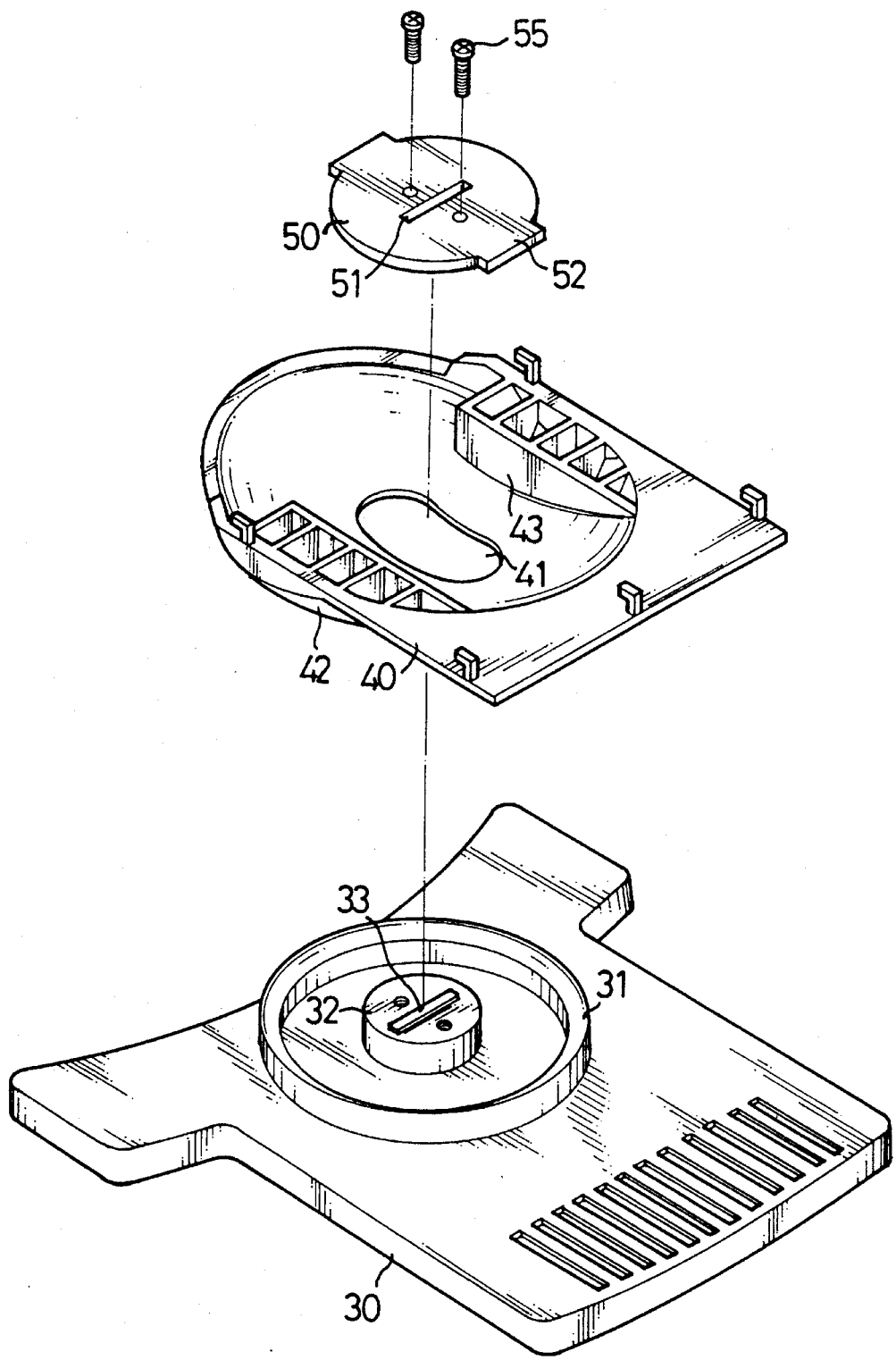
FIG. 5 is an exploded view of the conventional rotatable bracket of FIG. 4.

FIG. 3 illustrates a cross-sectional view of FIG. 1 for showing the assembly of the upper plate 20 and the base plate 10. To assemble the upper plate 20 with the base plate 10, the wings 16 of the base plate 10 have to be passed through the square hole 23 of the upper plate 20 and three periphery walls defining the square hole 23 have to be engaged between the space defined between the wings 16 and the surface of the hemispherical recess 11 of the base plate 10. The flat head 211 of the hook 21 is blocked by a tip of the post 15 when the wings 16 of the base plate 10 are intended to be pushed through the square hole 23 of the base plate 10. It should be noted that the flat head 211 of the hook 21 is reversible when forced by hand. Therefore, the flat head 211 is temporarily forced upward by the tip of the post 15, meanwhile the user slides the wings of the base plate 10 along the hemispherical surface of the recess 11, thereafter the wings 16 are allowed to be manually slid in a range substantially along the periphery of the elongated hole 22. The semicircular cutout 212 mates with a periphery portion of the post 15 when the wings 16 are slid to a firstmost end. A periphery of the boss 14 is faced against a wall of the elongated hole 22 when the wings 16 are slid to a secondmost end. The upper plate 20 is rotatable when the wings 16 and the peripheral plate portion around the elongated hole 22 are mutually engaged are positioned in the slidable range defined in the periphery of the elongated hole 22. The bar 26 at the bottom of the upper plate 20 is limited in the grooves 13 of the hemispherical recess 11 of the base plate 10, thus the upper plate 20 is also limited in an angular range when the upper plate 20 is rotated with respect to the base plate 10. Further referring to FIG. 2, a plurality of L-shaped ears 25 which extend upward from the upper plate 20 are used to engage the rotatable bracket to a monitor (not shown) or the like, which is conventional and is not described in more detail.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A rotatable bracket comprising a base plate and an upper plate rotatably engaged on the base plate;

said base plate defining a hemispherical recess at substantially a central portion thereof, an annular protrusion projecting from an upper surface of said base plate substantially enclosing said hemispherical recess, a boss projecting upward from substantially a central point of said hemispherical recess, a post extending upward from said boss, a plurality of wings radially extending from substantially an upper periphery of said boss thus defining a space between said wings and a surface of said hemispherical recess;

said upper plate comprising a hemispherical protrusion extending downward from a bottom side thereof thus simultaneously defining a concave hemispherical surface at an opposite side of said hemispherical protrusion, an elongated hole and a substantially square hole being defined in said upper plate and being in communication with each other, a hook extending upward from the hemispherical surface of the upper plate substantially extended upward from a wall of the substantially square hole including a flat head which defines a semicircular cutout at one end thereof;

whereby said wings of said base plate are forcibly passed through the substantially square hole of the upper plate and two elongated plate portions along the elongated hole are allowed to be manually slid with respect to the wings of the base plate, meanwhile said upper plate is permitted to be rotated with respect to the boss of the base plate.

2. A rotatable bracket as claimed in claim 1, further comprising two relative grooves defined in a surface of said hemispherical recess and two relative protrusions, a bar being projected from the bottom side of the upper plate substantially along a wall defining the elongated hole, said two grooves being in communication with each other, said two protrusions being isolated by said two grooves, said bar at the bottom of said upper plate being limited in the two grooves of the hemispherical recess of the base plate and slidable therein, said upper plate being limited in a rotatable angular range when the upper plate is rotated with respect to the base plate due to a rotating limitation from the two protrusions to said bar.

3. A rotatable bracket as claimed in claim 1, wherein said semicircular cutout mates with a periphery portion of the post when the wings are slid to a firstmost end of the elongated hole, a periphery of said boss is contacted against a wall of the elongated hole when the wings are slid to a secondmost end of the elongated hole, said upper plate is rotatable with respect to the base plate when the wings and the peripheral plate portions around the elongated hole are mutually engaged.

\* \* \* \* \*